United States Patent [19]

Mahoff

[11] 4,252,349
[45] Feb. 24, 1981

[54] HIGH PRESSURE PLASTIC PIPE COUPLING
[75] Inventor: George A. Mahoff, Buena Park, Calif.
[73] Assignee: Hydraflow Supply, Inc., Cerritos, Calif.
[21] Appl. No.: 14,749
[22] Filed: Feb. 23, 1979
[51] Int. Cl.³ .................. F16L 21/02; F16L 47/02
[52] U.S. Cl. .................. 285/238; 285/233; 285/332; 285/423; 285/DIG. 16
[58] Field of Search ............... 285/233, 234, 423, 297, 285/294, DIG. 16, 416, 296, 238, 421, 332, 373

[56] References Cited

U.S. PATENT DOCUMENTS

| 1,164,771 | 12/1915 | Wheeler | 285/296 X |
|---|---|---|---|
| 1,876,586 | 9/1932 | Austin | 285/423 X |
| 2,876,154 | 3/1959 | Usab | 285/238 X |
| 2,962,305 | 11/1960 | McCarthy et al. | 285/416 X |
| 2,998,269 | 8/1961 | Houghton | 285/423 X |
| 3,264,013 | 8/1966 | Richardson et al. | 285/423 X |
| 3,695,644 | 10/1972 | Goldberg | 285/233 |
| 3,776,579 | 12/1973 | Gale | 285/233 |
| 3,776,996 | 12/1973 | Cameron et al. | 285/423 X |
| 4,013,309 | 3/1977 | Quick | 285/DIG. 16 X |
| 4,035,002 | 7/1977 | Curtin | 285/DIG. 16 X |

FOREIGN PATENT DOCUMENTS

| 2711699 | 9/1978 | Fed. Rep. of Germany | 285/238 |
|---|---|---|---|
| 1214555 | 11/1959 | France | 285/238 |

Primary Examiner—Thomas F. Callaghan

[57] ABSTRACT

A high pressure plastic pipe coupling in which a formed in situ annular wedge converts axial loads on a flanged ring to compressive hoop stress loads on a reinforced resin pipe.

4 Claims, 6 Drawing Figures

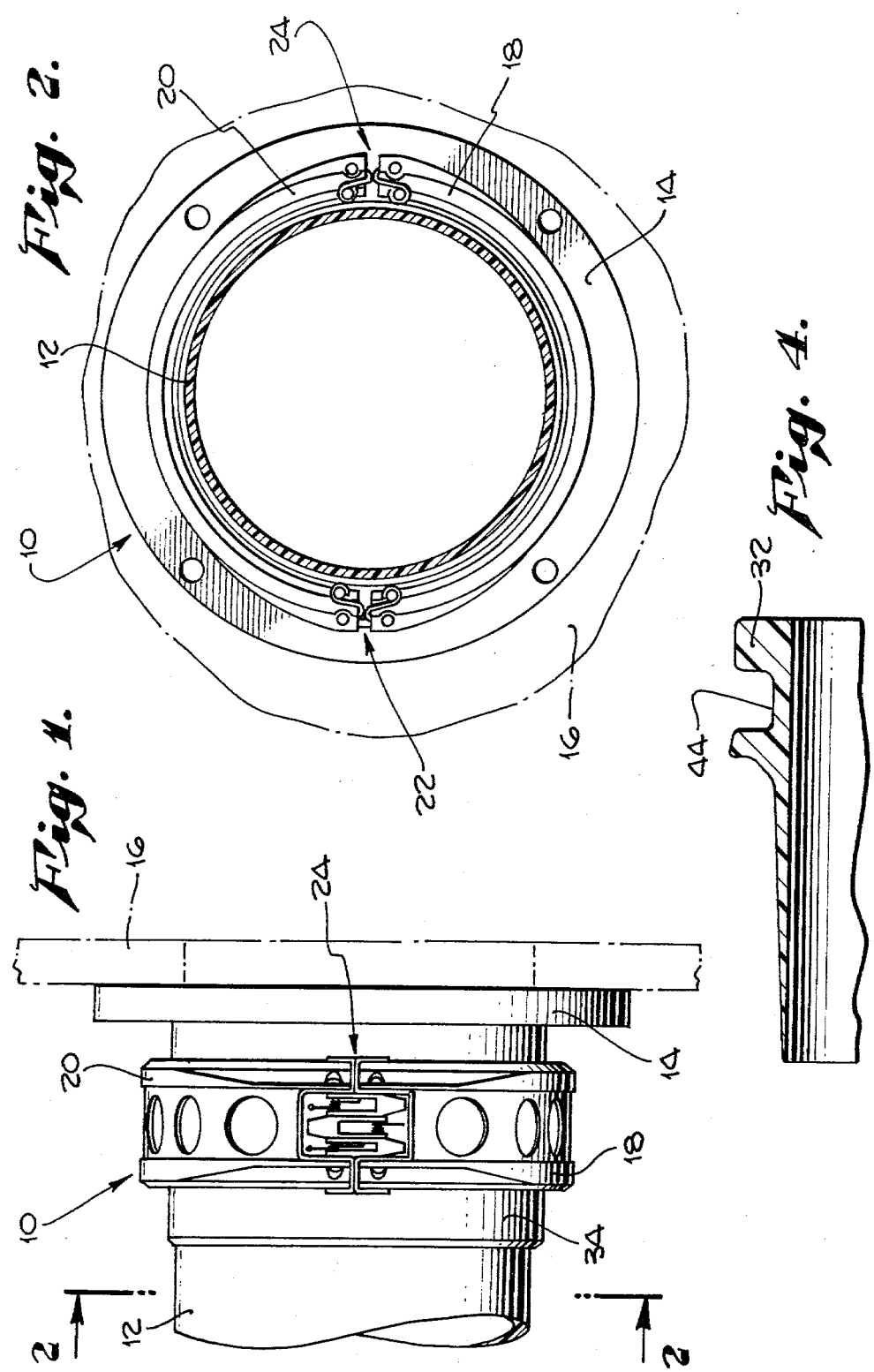

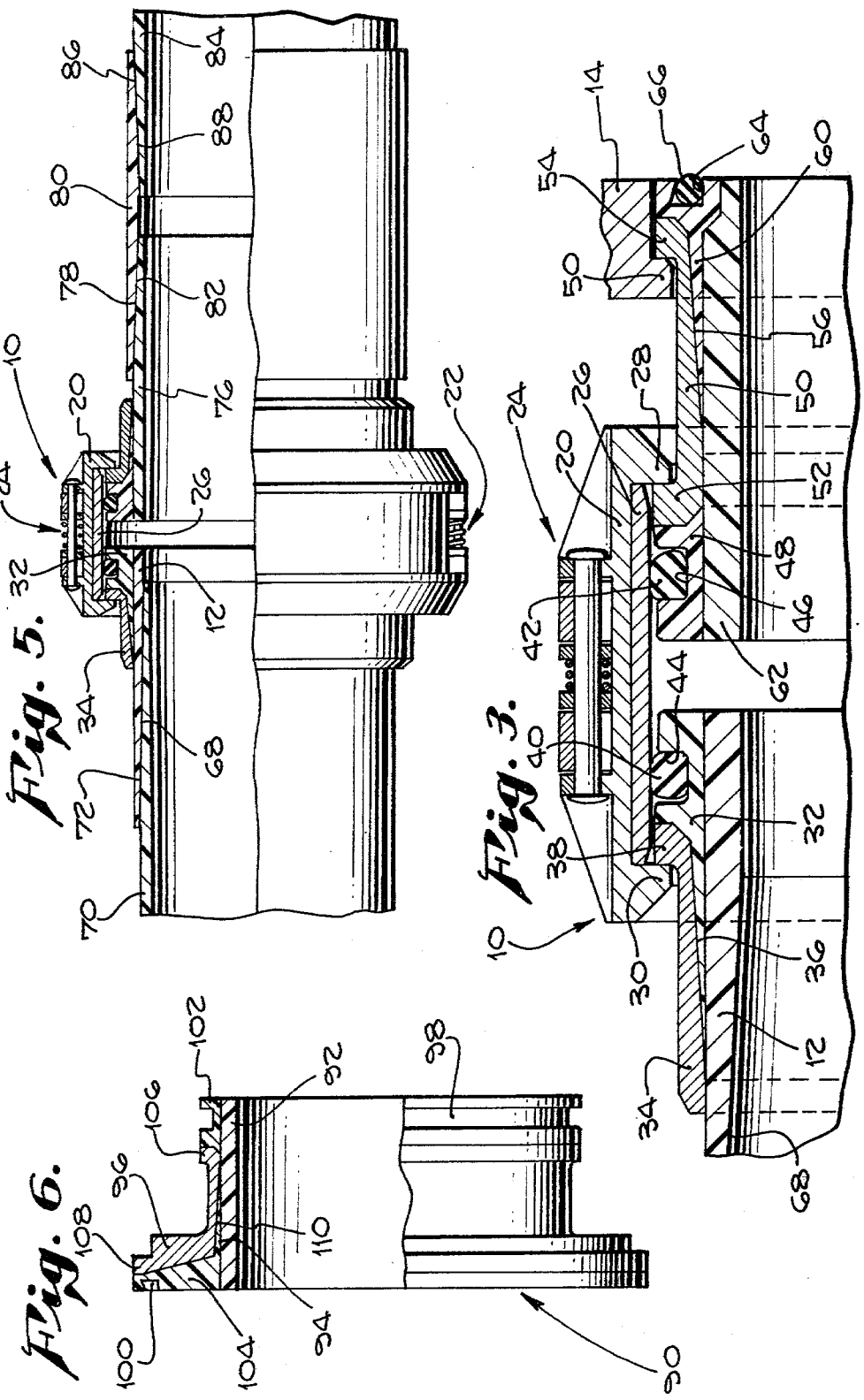

HIGH PRESSURE PLASTIC PIPE COUPLING

This invention relates to couplings for composite pipe and more particularly to flange members which convert a component of an axially applied load into hoop compressive stress.

Previously considerable difficulty had been experienced in providing couplings for composite plastic pipe. In general previous couplings suffered from one or more serious defects including failure at low pressures, complicated structures, special tooling, high labor factors, and uncertain reliability.

These and other difficulties of the prior art have been overcome according to the present invention wherein a flanged metallic reinforcing ring is provided with a generally conical shaped axial bore. The flange is positioned to receive axially applied loads. The diameter of the conical bore generally increases in the direction of the applied load. The axial bore is generally concentric with the flange which projects radially upwardly for engagement with a coupling member so as to receive the axial load. A composite plastic pipe which has a generally cylindrical exterior surface is received within the axial conical bore, and the space between the exterior of the pipe and the wall of the bore is filled with a reinforced resin which is cured in situ so as to bond the pipe to the wall of the bore. Loads are transmitted from the flange through the cured in situ reinforced resin and into the composite plastic pipe. The end of the composite plastic pipe which is not received within the bore may be tapered either internally or externally to form one-half of a bell and spigot joint according to conventional procedures. The axial loads which are received by the flange are converted by reason of the tapered bore into hoop compressive stress in the pipe. The axial loads act to attempt to pull the flange member off of the end of the length of composite plastic pipe. In so doing the cured in situ reinforced resin is compressed and acts as a wedge between the wall of the axial bore and the exterior surface of the composite plastic pipe. The wedging action of the reinforced resin places the composite plastic pipe in hoop compressive stress.

Composite plastic pipe is corrosion resistant, and for this reason is often employed in marine environments where corrosion resistance is desired and yet the use will not justify the expense of material such as titanium. Difficulties occur in the use of composite plastic pipe where elevated pressures in the order of 200 to 500 pounds per square inch are encountered. Pressures of this magnitude generally require that the composite pipe be constructed from spirally wrapped or wound glass filaments which are impregnated with resin. In general, several layers of wrapped, wound, or woven filament is employed in constructing the pipe wall. Such composite pipe is very strong in hoop tensile or compressive stress but tends to be relatively weak in axial shear. This creates substantial difficulties in attempting to apply a coupling to the composite plastic pipe. If the pipe coupling or fitting is mounted in grooves or threads in the composite plastic pipe, very light axial loads will cause the pipe to fail in axial shear. Capturing the end of the pipe between internal and external metal rings such as is proposed by certain prior workers requires special equipment and careful time-consuming attention to details so that the fitting is applied properly in such a way that no opportunity for a weakened area in which shear failure could occur is created in the formation of the coupling. In general composite plastic pipe is supplied to a construction site in standard lengths and is then cut, and the desired couplings are applied under field conditions. In certain circumstances the couplings are applied with the pipe already installed in place under working conditions which are awkward and permit only a minimum of working space. Also, repairs to existing piping systems generally are made under less than ideal working conditions. According to conventional procedures where it is desired to join two pieces of composite plastic pipe together in a permanent joint so as to form a continuous length of composite plastic pipe, long tapered bell and spigot joints are used with a coating of adhesive between the bell and spigot surfaces. Such bell and spigot joints have proven to be satisfactory for the permanent joining together of separate lengths of composite plastic pipe.

According to the present invention, a coupling is formed at a manufacturing facility and incorporates a short length of composite plastic pipe. The composite plastic pipe is provided at the end which is remote from the flange member with a taper so as to form one-half of a bell and spigot joint. At the site of use the length of composite plastic pipe to which the coupling is to be fitted is formed at its end into the other mating half of the bell and spigot joint, and the short length of composite plastic pipe which has the flange member mounted thereon is joined through the bell and spigot joint to the end of the composite plastic pipe where the coupling is required. The preparation of the coupling itself can be carried out at a separate location under carefully controlled manufacturing conditions, thus ensuring quality control as well as simplifying and speeding up installation at the site of use.

The necessary wedging action between the flange member and the plastic pipe is achieved through the use of a conical bore which has a cone angle of at least about 3 degrees. The maximum cone angle is generally dictated by the desired external proportions of the coupling but may be as much as 10 degrees or more if desired.

The wedging force should be uniformly distributed both circumferentially and axially of the reinforcing ring. To this end, the reinforced resin which forms the annular wedge shaped body between the reinforcing ring or flange member and the composite plastic pipe should be substantially continuous without any voids or cavities. Care is taken in manufacturing so that the lay up of reinforced resin is positioned on the exterior generally cylindrical surface of the pipe in a moldable pastelike form. The reinforcing ring is then carefully applied so as to exclude air bubbles in any significant size, and the reinforced resin is then cured in situ. In this way the annular wedging element is conformed substantially completely to the configurations of the pipe and reinforcing ring.

In general the coupling is sealed by an O-ring mounted in a cavity. The mass of reinforced resin is conveniently extended so as to provide sufficient material from which an annular O-ring retaining groove may be machined.

The composite plastic pipe is generally constructed from glass fiber or filament combined with thermosetting plastic materials, such as epoxy and polyester materials. The annular wedging element is generally composed of a glass fiber or filament reinforced thermoset plastic material such as epoxy, polyester, or vinyl ester thermosetting polymeric materials. In general the polymeric resins or plastic materials are selected so that they are substantially rigid in the cured condition.

A wide variety of couplings may be constructed utilizing the teachings of the present invention including, for example, flexible couplings, bulkhead couplings, rigid couplings, threaded couplings, and the like.

Referring particularly to the drawings for the purposes of illustration only and not limitation, there is illustrated:

FIG. 1 is a plan view of a flexible coupling between a plastic composite pipe and a bulkhead mounting utilizing coupling members according to the present invention;

FIG. 2 is a cross-sectional view taken along line 2—2 of FIG. 1;

FIG. 3 is an enlarged cross-sectional view of the embodiment of FIG. 1;

FIG. 4 is a partial cross-sectional view of a flange according to the present invention;

FIG. 5 is a view similar to FIG. 3 showing bell and spigot connections between the coupling member and composite pipes; and FIG. 6 is a cross-sectional view of a reinforcing ring according to the present invention.

Throughout the accompanying drawings like reference numerals have been assigned the corresponding parts for ease in comprehending the various embodiments.

Referring particularly to the drawings, there is illustrated generally at FIG. 1 a flexible coupling 10 of the clam shell type which is mounted through a suitable coupling to a length of composite plastic pipe 12. Pipe 12 is of the reinforced resin high pressure type which is adapted to withstand internal pressures up to 700 pounds per square inch or more. In the embodiment of FIGS. 1 through 4 the coupling is adapted to be mounted to a bulkhead 16 through a bulkhead mounting ring 14. Flexible coupling 10 includes semicircular segments 18 and 20 which are hinged together by hinge assembly 22. The semicircular segments are spring biased toward the open configuration, and the hinge assembly 22 includes electrical bonding elements. The ends of the semicircular segments 18 and 20 which are remote from hinge assembly 22 are mounted to latch assembly 24 which includes three latch pawls interengaged with latch pins. The latch pawls are spring biased into engagement with the latch pins so that all three latch pawls must be simultaneously released in order to open flexible coupling 10. The semicircular segments 18 and 20, when in the closed configuration, confine a sleeve 26, see FIG. 3, in operative relationship so as to effect fluid tight sealing of the coupling. Semicircular segments 18 and 20 are provided with inwardly extending radial flanges 28 and 30, respectively. Sleeve 26 is confined between the radial flanges 28 and 30. A generally metallic flange ring 34 is mounted over the length of composite plastic pipe 12. The generally flanged ring 34 is provided with an axial conical bore 36. The exterior surface of pipe 12 which is radially inwardly from flange ring 34 is generally cylindrical and is bonded to the wall of axial conical bore 36 by a mass of generally rigid cured in situ reinforced resin 32. Resin 32 in its cured condition provides a wedging element between the cylindrical exterior surface of pipe 12 and axial conical bore 36. The reinforced resin 32 is molded in place so that it conforms to the surface of pipe 12 and axial conical bore 36. Flange ring 34 is provided with a radial flange 38 which is adapted to be engaged with and receive axially applied loads from radial flange 30 of semicircular segments 18 and 20. Axial loads are applied to radial flange 38 in the direction of the open end of pipe 12 which is closed by flexible coupling 10. The wedging action of the reinforced resin wedging element 32 between bore 36 and pipe 12 causes a substantial component of the axially applied load to be exerted as compressive hoop stress on pipe 12. The close conformance and tight bonding of the reinforced wedging element 32 to the cylindrical outer surface of pipe 12 and the conical bore 36 ensures that the hoop stress is evenly distributed around the pipe 12 so that no excessive localized concentrations of force occur. The mass of reinforced resin is carried beyond the annular wedging section into an enlarged mass at the end of the length of pipe 12. The enlarged mass of reinforced resin is machined and a fixed cavity O-ring groove 44 is cut into the mass of resin. Fixed cavity O-ring groove 44 receives O-ring 40. O-ring 40 cooperates with the smooth cylindrical inner surface of sleeve 26 so as to provide a fluid type seal at flexible coupling 10. The short length of reinforced resin pipe 62 is a composite formed by spirally wrapping layers of resin precursor impregnated glass filaments around a mandrel. Several layers of resin impregnated glass filaments are applied, and the resultant composite is cured to a thermoset condition. The cylindrical exterior surface of pipe 62 is generally machined lightly to provide a uniform surface. A mass of reinforced resin 48 is molded to and cured in situ on the cylindrical exterior surface of pipe 62 so as to bond therewith. This mass of resin is then machined and provided with a fixed cavity O-ring groove 46 in which O-ring 42 is received. O-ring 42 cooperates with sleeve 26 in the same way as O-ring 40. Pipe 62 is received within the axial tapered bore 56 of flange ring 50. Flange ring 50 is provided with two radially extending flanges 52 and 54. Flange 52 is adapted to engage with radial flange 28 of semicircular segments 18 and 20. Radial flange 54 is adapted to engage with the shoulder 58 of bulkhead mounting ring 14. Shoulder 58 transmits axial loads to radial flange 54. Flange ring 50 by reason of cooperation between annular wedge 60 and tapered bore 56 converts a substantial component of such axially applied loads into compressive hoop stess on reinforced resin pipe 62. Annular wedge 60 is extended so as to provide a mass of reinforced resin into which fixed cavity O-ring groove 64 is machined and O-ring 66 is mounted for sealing engagement with bulkhead 16. The length of composite plastic pipe 12 is provided with an internal taper 68 which forms the bell side of a bell and spigot joint.

Referring particularly to FIG. 5, there is illustrated a composite pipe 70 which has a coupling according to the present invention mounted on one end thereof. The end of composite pipe 70 is provided with a spigot taper 72 which matches with a bell taper 68 which is provided on pipe 12. The application of adhesive to the mating surfaces of the bell and spigot tapers 68 and 72 respectively permits pipe 70 to be joined to the length of pipe 12 at the location where the presence of flexible coupling 10 is desired. Length of pipe 12 is conveniently incorporated as a part of the coupling during its manufacture at some remote location. The other side of flexible coupling 10 includes a length of composite glass-resin pipe 76 which is provided with a spigot taper 78 on its external surface which is adapted to mate with a bell taper 82 on the internal surface of annular composite sleeve 80. The remote end of sleeve 80 is provided with a bell taper 88 which is adapted to mate with and be bonded adhesively to a spigot taper 86 of a section of composite pipe 84. The adhesively bonded bell and spigot joints are conveniently prepared using simple tools with a minimum amount of time under on-site construction conditions. The joints which are thus formed are very rigid and have substantially the same strength and characteristics as the original composite pipe.

Referring particularly to FIG. 6, there is illustrated another embodiment of a flange element 90 in which a length of composite pipe 92 is bonded through an annular cured in situ wedge of reinforced resin 94 to a tapered bore 110 in metallic retainer ring 96. Fixed cavity O-ring grooves 98 and 100 are machined into the bodies of reinforced cured in situ resin 102 and 104 respectively. Shoulders 106 and 108 on retainer ring 96 are adapted to receive axially applied loads which are converted in large part to compressive hoop stress through the action of tapered axial bore 110 acting on the length of composite pipe 92 through annular wedge 94.

What has been described are preferred embodiments in which modifications and changes may be made without departing from the spirit and scope of the accompanying claims.

What is claimed is:

1. A coupling member for reinforced resin pipe which is capable of withstanding from about 200 to 500 pounds per square inch comprising:

a metallic reinforcing ring means for receiving an axially applied load and converting a substantial component of said load into hoop compressive stress on said pipe, said reinforcing ring means including an axial conical bore having a cone angle of from about three to ten degrees, the diameter of said bore increasing in the direction of said load a length of said pipe having one end received within said bore; and an annular wedging element means for wedging co-action with said reinforcing ring means, said annular wedging element means including a mass of resin cured in situ on the exterior surface of said pipe and bonded therewith, said annular wedging element means being closely conformed to and bonded to said bore, said annular wedging element means being adapted to distribute said compressive hoop stress evenly without excessive localized concentration of forces.

2. A coupling member according to claim 1 wherein said length of reinforced resin pipe is a composite of glass filament and thermoset resin.

3. A coupling member according to claim 1 wherein an end of said length of reinforced resin pipe which is not received within said bore is tapered to form one part of a bell and spigot joint.

4. A coupling member according to claim 1, including an O-ring groove in said annular wedging element means, said O-ring groove being spaced from said bore.

* * * * *